(12) United States Patent
Chee et al.

(10) Patent No.: US 10,389,237 B1
(45) Date of Patent: Aug. 20, 2019

(54) LIGHT-LOAD EFFICIENCY IMPROVEMENT OF HYBRID SWITCHED CAPACITOR CONVERTER

(71) Applicant: Linear Technology Holding LLC, Norwood, MA (US)

(72) Inventors: San-Hwa Chee, San Ramon, CA (US); Yingyi Yan, Fremont, CA (US)

(73) Assignee: Linear Technology Holding LLC, Norwood, MA (US)

( * ) Notice: Subject to any disclaimer, the term of this patent is extended or adjusted under 35 U.S.C. 154(b) by 0 days.

(21) Appl. No.: 15/957,845

(22) Filed: Apr. 19, 2018

(51) Int. Cl.
*H02M 3/07* (2006.01)
*H02M 3/158* (2006.01)
*H02M 1/00* (2006.01)

(52) U.S. Cl.
CPC ............ *H02M 3/07* (2013.01); *H02M 3/158* (2013.01); *H02M 2001/0009* (2013.01); *H02M 2001/0035* (2013.01)

(58) Field of Classification Search
CPC ............ H02M 3/07; H02M 2003/072; H02M 2001/0035; H02M 2001/0054; H02M 3/158; H02M 3/1588
See application file for complete search history.

(56) References Cited

U.S. PATENT DOCUMENTS

| | | | | |
|---|---|---|---|---|
| 9,595,871 | B1* | 3/2017 | Bayer | H02M 3/1582 |
| 2004/0245972 | A1* | 12/2004 | Vire | H02M 3/07 323/282 |
| 2008/0239772 | A1* | 10/2008 | Oraw | H02M 3/07 363/60 |
| 2009/0033293 | A1* | 2/2009 | Xing | H02J 7/0077 320/164 |
| 2014/0239719 | A1* | 8/2014 | Kumar | H02M 3/07 307/31 |
| 2015/0180355 | A1* | 6/2015 | Freeman | H02M 1/08 363/21.04 |
| 2016/0190921 | A1* | 6/2016 | Kumar | H02M 3/158 323/271 |
| 2018/0294717 | A1* | 10/2018 | Zhang | H02M 3/073 |
| 2019/0089252 | A1* | 3/2019 | Li | H02M 3/158 |

OTHER PUBLICATIONS

"Chinese Application Serial No. 201910310344.5, Notification to Make Rectification dated Apr. 30, 2019".

* cited by examiner

*Primary Examiner* — Harry R Behm
(74) *Attorney, Agent, or Firm* — Schwegman Lundberg & Woessner, P.A.

(57) ABSTRACT

The subject disclosure includes reducing switching losses at lower load current while maintaining the switching frequency for a hybrid switched capacitor converter circuit. Control circuitry is coupled to the hybrid switched capacitor converter circuit and configured to measure a load current at an output of the hybrid switched capacitor converter circuit in a buck phase mode. The control circuitry is configured to compare the measured load current to set of predetermined thresholds. The control circuitry is configured to drive a first voltage to the second set of transistors that turns on the second set of transistors periodically to regulate the output during the buck phase mode. The control circuitry is also configured to drive a second voltage to the first set of transistors that turns off the first set of transistors for one or more switching cycles while the second set of transistors are turned on based on the comparison.

28 Claims, 8 Drawing Sheets

LIGHT-LOAD EFFICIENCY IMPROVEMENT OF HYBRID SWITCHED CAPACITOR CONVERTER

FIELD OF THE DISCLOSURE

The present description relates generally to power converter systems, and more particularly, to light-load efficiency improvement of hybrid switched capacitor converter.

BACKGROUND

Power converters are used to convert electrical power having one voltage level (e.g., 12V) to electrical power having a different voltage level (e.g., 3V). Power converters can also be used to convert power having one type (e.g., alternating current (AC) power) to power having a different type (e.g., direct current (DC) power). Switching mode power converters are widely used because of their high efficiency.

SUMMARY OF THE DISCLOSURE

The subject disclosure provides for mitigating the impact of switching losses at light load current (i.e., increase the efficiency at light load current) without affecting the efficiency at heavy load current, resulting in high efficiency throughout the entire load range. In some aspects, subject technology reduces the switching losses at lower load currents while maintaining the switching frequency for a switched capacitor converter circuit. For example, control circuitry is coupled to the switched capacitor converter circuit and is configured to measure a load current at an output of the hybrid switched capacitor converter circuit. The control circuitry is also configured to compare the measured load current to one or more predetermined thresholds. The control circuitry is configured to drive a first voltage to the second set of transistors that turns on the second set of transistors periodically to regulate the output during the buck phase mode. The control circuitry is also configured to drive a second voltage to the first set of transistors that turns off the first set of transistors for one or more switching cycles while the second set of transistors are switching based on the comparison.

According to an embodiment of the present disclosure, an apparatus for reducing switching losses in output voltage regulation includes a switched capacitor converter circuit comprising a first set of transistors and a second set of transistors, and control circuitry coupled to the switched capacitor converter circuit. In some aspects, the control circuitry is configured to periodically switch, during a buck phase of the switched capacitor converter circuit, the first and second sets of transistors on and off converse to each other according to a switching scheme to provide a load current at an output of the switched capacitor converter circuit. The control circuitry is configured to measure the load current at the output of the switched capacitor converter circuit. The control circuitry is configured to periodically switch, during the buck phase, in response to and while the measured load current satisfies a first threshold of a set of predetermined thresholds, the first set of transistors off for a first period of switching cycles during which the second set of transistors are periodically switched on an off according to the switching scheme. The control circuitry is configured to resume, in response to the measured load current satisfying a second threshold of the set of predetermined thresholds, switching the first set of transistors on and off according to the switching scheme.

According to an embodiment of the present disclosure, a method of reducing switching losses in output voltage regulation includes biasing a first set of transistors and a second set of transistors of a switched capacitor converter circuit to periodically switch, during a buck phase of the of the switched capacitor converter circuit, the first and second sets of transistors on and off converse to each other according to a switching scheme to provide a load current at an output of the switched capacitor converter circuit. The method includes measuring a load current at the output of the switched capacitor converter circuit. The method includes biasing the first set of transistors to periodically switch, during the buck phase, in response to and while the measured load current satisfies a first threshold of a set of predetermined thresholds, the first set of transistors off for a first period of switching cycles during which the second set of transistors are periodically switched on an off according to the switching scheme. The method includes resuming, in response to the measured load current satisfying a second threshold of the set of predetermined thresholds, switching the first set of transistors on and off according to the switching scheme.

According to an embodiment of the present disclosure, a system for reducing switching losses in output voltage regulation includes means for periodically switching, during a buck phase of a switched capacitor converter circuit, a first set of transistors and a second set of transistors on and off converse to each other according to a switching scheme to provide a load current at an output of the switched capacitor converter circuit. The system includes means for measuring a load current at the output of the switched capacitor converter circuit. The system includes means for periodically switching, during the buck phase, in response to and while the measured load current satisfies a first threshold of a set of predetermined thresholds, the first set of transistors off for a first period of switching cycles during which the second set of transistors are periodically switched on an off according to the switching scheme. The system includes means for resuming, in response to the measured load current satisfying a second threshold of the set of predetermined thresholds, switching the first set of transistors on and off according to the switching scheme.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject disclosure provides for mitigating the impact of switching losses at light load current (i.e., increase the efficiency at light load current) without affecting the efficiency at heavy load current, resulting in high efficiency throughout the entire load range. Hence, a super burst mode is added. In this mode (when the load current is low), charge pump transistors, e.g., Q1 and Q2, are periodically turned off for multiple switching cycles during which buck transistors, e.g., Q3 and Q4, continue to periodically switch on and off to regulate the output voltage. During the buck phase, $C_{MID}$ will be the supply of this regulator, and if $C_{MID}$ is large enough and the load current is low enough, the voltage across this capacitor will not droop significantly enough even if one or more of the charge pump phases are skipped. Since two transistors are driven during the super burst mode instead of four transistors, switching losses are reduced.

There are many ways to implement super burst mode but the result is the same, i.e. to skip turning on some of the transistors occasionally during the buck phase mode. For example, load current can be sensed and used to determine the condition to enter or exit super burst mode and a counter can be used to determine how many switching cycles to skip before performing a charge pump phase. The number of switching cycles to skip can also be increased as the load current decreases. Instead of current, a voltage that is reflective of the load current can also be used, such as the compensation node of an error amplifier. As used herein, the term "period of switching cycles" may be interchangeably used with the term "number of switching cycles." In some aspects, the "period of switching cycles" includes the "number of switching cycles" without departing from the scope of the disclosure.

In some implementations, the super burst mode can be implemented in succession with other various modes that the converter is operating, such as, among others, force continuous conduction mode (or FCCM), pulse skip mode, discontinuous conduction mode (or DCM), and burst mode.

In some implementations, an apparatus for reducing switching losses in output voltage regulation includes a switched capacitor converter circuit comprising a first set of transistors and a second set of transistors, and control circuitry coupled to the switched capacitor converter circuit. In some aspects, the control circuitry is configured to periodically switch, during a buck phase of the of the switched capacitor converter circuit, the first and second sets of transistors on and off converse to each other according to a switching scheme to provide a load current at an output of the switched capacitor converter circuit. The control circuitry is configured to measure the load current at the output of the switched capacitor converter circuit. The control circuitry is configured to periodically switch, during the buck phase, in response to and while the measured load current satisfies a first threshold of a set of predetermined thresholds, the first set of transistors off for a first period of switching cycles during which the second set of transistors are periodically switched on an off according to the switching scheme. The control circuitry is configured to resume, in response to the measured load current satisfying a second threshold of the set of predetermined thresholds, switching the first set of transistors on and off according to the switching scheme.

Figures 1A, 1B, 1C:
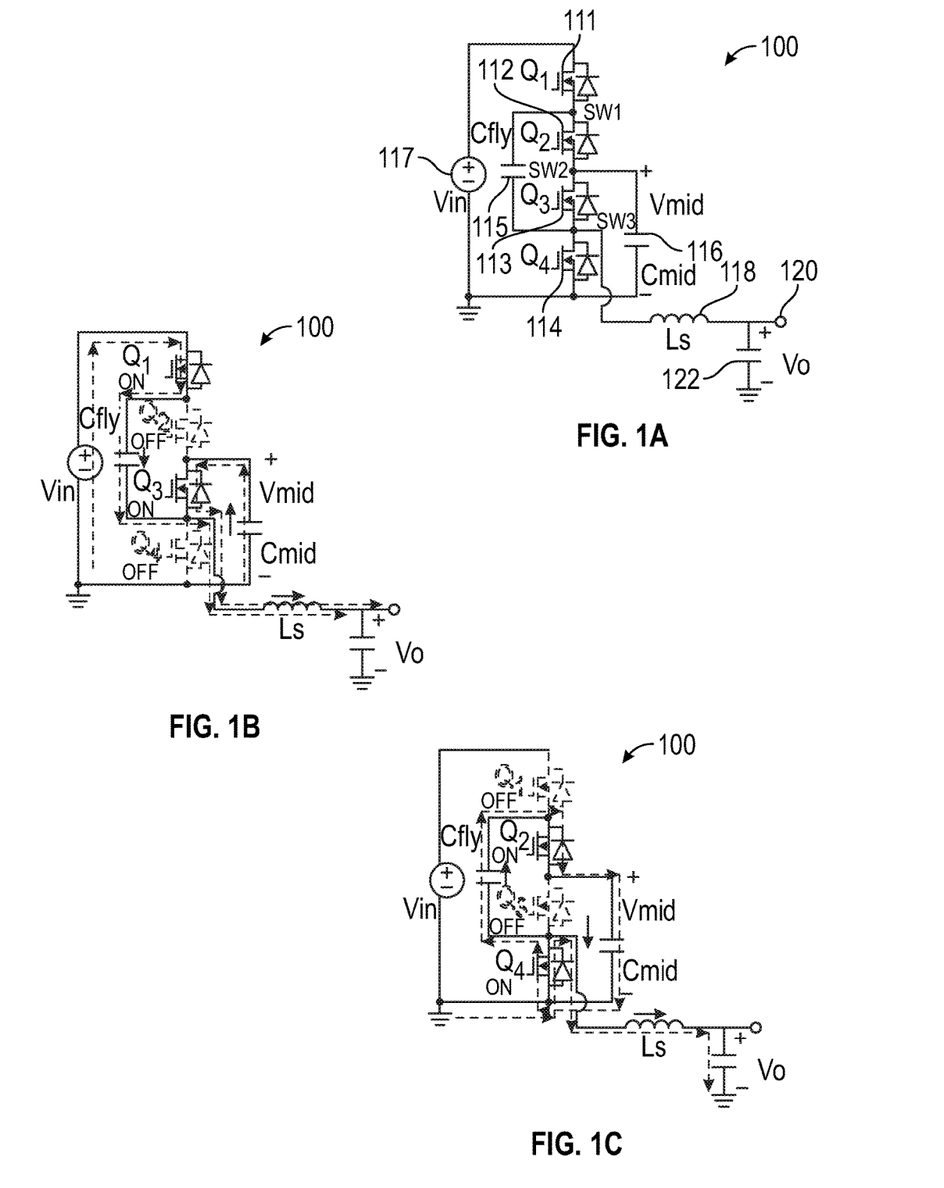
FIG. 1A illustrates a schematic diagram of an example of a hybrid switched capacitor converter in accordance with one or more implementations of the subject technology.
FIG. 1B illustrates a schematic diagram of an example of current flow in a hybrid switched capacitor converter in a first stage of operation in accordance with one or more implementations of the subject technology.
FIG. 1C illustrates a schematic diagram of an example of current flow in a hybrid switched capacitor converter in a second stage of operation in accordance with one or more implementations of the subject technology.

FIG. 1A illustrates a schematic diagram of an example of a hybrid switched capacitor converter circuit 100 in accordance with one or more implementations of the subject technology. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

As shown in FIG. 1A, the hybrid switched-capacitor converter circuit 100 operates as a switched-capacitor voltage divider converter. In FIG. 1A, the transistors Q1 to Q4 are coupled in series, with Q2 and Q3 being coupled in parallel with $C_{FLY}$, and Q3 and Q4 being coupled in parallel to the capacitor $C_{MID}$. The voltage across the capacitor $C_{MID}$ 116 serves as the buck phase input voltage rather than the input voltage $V_{IN}$ 117. The output voltage $V_{OUT}$ 120 can be provided by a voltage divider at node SW3, which is a ratio of the voltage across the transistors Q3 and Q4. The output voltage $V_{OUT}$ can be controlled by the PWM duty-cycle of transistor Q3 and transistor Q4.

In the example of FIG. 1A, the transistors, which by way of example only and not by way of limitation, are illustrated to be metal oxide semiconductor field effect transistors (MOSFETs) Q1 and Q3 (e.g., 111 and 113), are turned ON and OFF in a way that is complementary to transistors Q2 and Q4 (e.g., 112 and 114), as illustrated in FIGS. 1B and 1C. As illustrated in FIGS. 1B and 1C, during steady state operation, the transistors Q1-Q4 (111 to 114) are switched to cyclically charge and discharge capacitor 115, sometimes referred to as a flying capacitor $C_{FLY}$ and capacitor 116 (e.g., $C_{MID}$).

The hybrid switched-capacitor converter circuit 100 has a voltage ratio of 2:1, from the $V_{IN}$ node to the $V_{MID}$ node, as illustratively shown in FIG. 1A. In particular, the transistors are shown to switch at around 50% duty cycle. However, this voltage ratio is set to 2:1 regardless of the duty cycle. In FIG. 1A, the power MOSFETs of the hybrid switched-capacitor converter circuit 100 are exposed to voltage stress of $V_{IN}/2$ because the series interconnection of the capacitors $C_{FLY}$ and $C_{MID}$ between the input node $V_{IN}$ and ground (through transistors Q1 and Q3) serve to divide the input voltage by two. In some aspects, as long as the switch impedance is reasonably low, the sum of the voltage across the capacitor $C_{FLY}$ 115 (e.g., $V_{FLY}$) and the voltage across the capacitor $C_{MID}$ 116 (e.g., $V_{MID}$) is equal to the input voltage $V_{IN}$ 117 when the transistors Q1 111 and Q3 113 are turned on. When the transistors Q2 112 and Q4 114 are turned on, the voltage across the capacitor $C_{MID}$ 116 becomes equal to the voltage across the capacitor $C_{FLY}$ 115. In this respect, the voltage across the capacitor $C_{FLY}$ 115 and the voltage across the capacitor $C_{MID}$ 116 each equals to $V_{IN}/2$. In some aspects, a generalized hybrid switched capacitor converter could more generally have a different step-up or step-down ratio (e.g., a 3:1 ratio, a 4:1 ratio, a 3:2 ratio, a 4:3 ratio, or the like), for example.

In some aspects, the on time length ratio of the transistors Q3 113 and Q4 114 changes the output voltage $V_{OUT}$ 120. For example, when the transistor Q3 113 is turned on, the node at SW3 equals to the voltage across the capacitor $C_{MID}$ 116 (e.g., $V_{MID}$). When the transistor Q4 114 is turned on, the node at SW3 is pulled to ground (i.e., 0V). In this respect, the waveform observed at the node SW3 is a pulse width modulated square wave. The inductor $L_S$ 118 and an output capacitor 122 filter out the AC component of the output signal and supply the average value of the SW3 node at the output voltage 120 (e.g., $V_{OUT}$). For example, the output voltage 120 is $V_{MID}/2$ (or $V_{IN}/4$) when the transistor Q3 113 is switched on 50%. In another example, the output voltage 120 is $V_{MID}/4$ (or $V_{IN}/8$) when the transistor Q3 113 is switched on 25%.

The hybrid switched capacitor converter circuit 100 can be a non-regulated, open loop converter running at a pre-determined duty-cycle. In some implementations, if output voltage regulation is expected, a feedback controller (not shown) can monitor the level of the output voltage $V_{OUT}$ (e.g., 120) and regulate operation of the hybrid switched-capacitor converter circuit 100 to maintain a desired output voltage level.

In particular, the feedback controller may measure or sense the output voltage level $V_{OUT}$ at the output node(s), and may control the operation of transistors in the switched-capacitor converter 100 to regulate the voltage level $V_{OUT}$ 120 at the desired level. For example, the feedback controller can control which transistors are turned on/off, the switching duty-cycle of the transistors (e.g., 111-114) of the hybrid switched capacitor converter circuit 100 to thereby regulate the voltage level $V_{OUT}$ 120.

In operation of the hybrid switched-capacitor converter circuit 100, the feedback controller controls operation of the transistors Q1-Q4. In some implementations, the transistors Q1 111 and Q3 113 are operated in unison, and the transistors Q2 and Q4 are operated in unison. Further, the transistors Q1 111 and Q3 113 are operated complementarily to the transistors Q2 and Q4 such that the transistors Q1 111 and Q3 113 are generally not open/conducting at the same time as the transistors Q2 112 and Q4 114.

Under normal operating condition, the transistors Q1 111 and Q3 113 are turned ON while the transistors Q2 112 and Q4 114 are turned off and vice versa. The switching of the transistors Q1-Q4 is a charge pump action that generates a voltage of approximately $V_{IN}/2$ across the capacitor $C_{MID}$ 116. The switching of the transistors Q3 113 and Q4 114 is akin to a traditional buck converter and by controlling its duty cycle, the output will be regulated except that this buck input voltage is supplied by the capacitor $C_{MID}$ 116 rather than the input voltage $V_{IN}$ 117. Hence the duty cycle of the transistors Q1, Q3 (e.g., 111, 113) is given by Equation 1:
Duty Cycle, $$DC = \frac{V_{OUT}}{V_{MID}} = \frac{2*V_{OUT}}{V_{IN}} \qquad \text{Equation (1)}$$

In this manner, in one example, transistors Q1 111 and Q3 113 are closed during a first phase of operation while transistors Q2 112 and Q4 114 are open. In turn, during a second phase of operation, transistors Q1 111 and Q3 113 are open while transistors Q2 112 and Q4 114 are closed. In the example, the hybrid switched-capacitor converter circuit 100 may alternate between the first and second phases of operation, and the feedback controller may vary the relative lengths of the first and second phases (e.g., control the pulse width of signals controlling the transistors Q1-Q4) in order to regulate the output voltage level $V_{OUT}$ to reach (and maintain) a particular voltage. During the first phase of operation, the capacitors $C_{FLY}$ and $C_{MID}$ are coupled in series between $V_{IN}$ and ground by closed transistors Q1 111 and Q3 113, and the capacitors are charged by the voltage $V_{IN}$. In this phase of operation, the switching node SW2 common to capacitors $C_{FLY}$ and $C_{MID}$ may thus be charged to a voltage of approximately $V_{IN}/2$. In turn, during the second phase of operation, the capacitors $C_{FLY}$ and $C_{MID}$ are coupled in parallel with each other, and the switching node SW3 is brought to a ground voltage by the switch Q4.

Before turning ON the transistors Q2 112 and Q4 114, the transistors Q1 111 and Q3 113 are on. In this respect, the node SW1 is pulled to the input voltage $V_{IN}$ 117, and the node SW2 is pulled up to the voltage across the capacitor $C_{MID}$ 116 (e.g., $V_{MID}$). After the transistors Q1 111 and Q3 113 are turned off, the transistors Q2 112 and Q4 114 are then turned ON. In this respect, the capacitors $C_{FLY}$ 115 and $C_{MID}$ 116 are connected in parallel and the voltage across them is the same.

FIG. 1B illustrates a schematic diagram of an example of current flow in the hybrid switched capacitor converter circuit 100 in a first phase of operation in accordance with one or more implementations of the subject technology. In the example of FIG. 1B, when transistors Q1 111 and Q3 113 are turned ON, capacitors $C_{FLY}$ 115 and $C_{MID}$ 116 are effectively connected in series, thereby charging $C_{FLY}$ 115 and $C_{MID}$ 116 to approximately $V_{IN}/2$. The capacitors $C_{FLY}$ 115 and $C_{MID}$ 116 are initially charged by the input voltage $V_{IN}$ at start-up, where the voltage across the nodes of $C_{FLY}$ 115 and $C_{MID}$ 116 is at $V_{IN}/2$. The transistors Q1-Q4 (111 to 114) may also be external to the package to accommodate higher currents. The input voltage $V_{IN}$ 117 is directly connected to a first terminal of the transistor Q1 (111), where capacitor—$C_{FLY}$ 115 is connected to $V_{IN}$ 117 via the transistor Q1 (111) when it is turned ON.

FIG. 1C illustrates a schematic diagram of an example of current flow in a hybrid switched capacitor converter in a second phase of operation in accordance with one or more implementations of the subject technology. In the example of FIG. 1C, when the transistors Q2 112 and Q4 114 are turned ON, the capacitors $C_{FLY}$ 115 and $C_{MID}$ 116 are coupled in parallel. This arrangement forces the voltages across capacitors $C_{FLY}$ 115 and $C_{MID}$ 116 to be substantially similar at approximately $V_{IN}/2$.

Figure 1D:
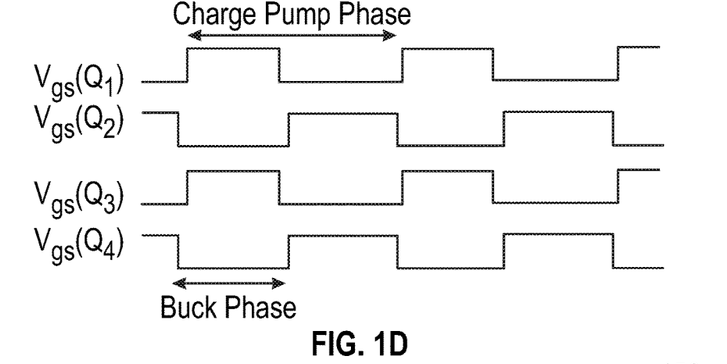
FIG. 1D illustrates a diagram of timing waveforms depicting a control scheme for the hybrid switched capacitor converter in accordance with one or more implementations of the subject technology.

FIG. 1D illustrates a diagram of timing waveforms depicting a control scheme for the hybrid switched capacitor converter in accordance with one or more implementations of the subject technology. As shown in FIG. 1D, the first timing waveform depicts the gate-source voltage response of a first transistor (e.g., Q1 111), the second timing waveform depicts the gate-source voltage response of a second transistor (e.g., Q2 112), the third timing waveform depicts the gate-source voltage response of a third transistor (e.g., Q3 113), and the fourth timing waveform depicts the gate-source voltage response of a fourth transistor (e.g., Q4 114). As used herein, the term "clock cycle" refers to a cycle of time between two adjacent pulses of an oscillator, and one clock cycle consists of two intervals: a first interval of the cycle and a second interval of the cycle subsequent to the first interval. In the first interval, the first pulse for transistors Q1 and Q3 is high (or a low-to-high transition), whereas the first pulse for transistors Q2 and Q4 is low (or a high-to-low transition). Conversely, in the second interval, the second pulse for transistors Q2 and Q4 is high, whereas the second pulse for transistors Q1 and Q3 is low.

In the first interval of the clock cycle during the charge pump phase mode of the switched capacitor converter circuit 100, the transistors Q1 and Q2 (e.g., 111, 112) are operated complementary to one another. In this first interval, the transistor Q1 111 is charged to a gate-source voltage that turns on the transistor Q1 111 for one clock cycle. During the same duration, in the buck phase mode, the transistor Q3 113 is charged to the gate-source voltage that turns on the transistor Q3 113 and operated in unison with the transistor Q1 111 for one clock cycle to regulate the output voltage $V_{OUT}$ 120.

In the second interval of the clock cycle during the charge pump phase mode, the transistor Q2 112 is charged to a gate-source voltage that turns on the transistor Q2 112 for one clock cycle. During the same duration, in the buck phase mode, the transistor Q4 114 is charged to the gate-source voltage that turns on the transistor Q4 114 and operated in unison with the transistor Q2 112 for one clock cycle to regulate the output voltage $V_{OUT}$ 120. In this second interval, since the transistor Q1 111 and the transistor Q3 113 are operated in unison and operated complementary to the transistors Q2 112 and Q4 114, both transistors Q1 111 and Q3 113 are turned off during this clock cycle duration. In some implementations, the duty cycle controls the output voltage $V_{OUT}$ 120. The duty cycle may be defined as a ratio of one of the two adjacent intervals to the clock cycle (e.g., duty cycle=first interval/clock cycle). In this respect, the output voltage $V_{OUT}$ 120 may be defined as the multiplication of the voltage across the capacitor $C_{MID}$ 116 (e.g., $V_{MID}$) and the duty cycle (e.g., $V_{OUT}=V_{MID}*DUTY\_CYCLE$).

Figure 1E:
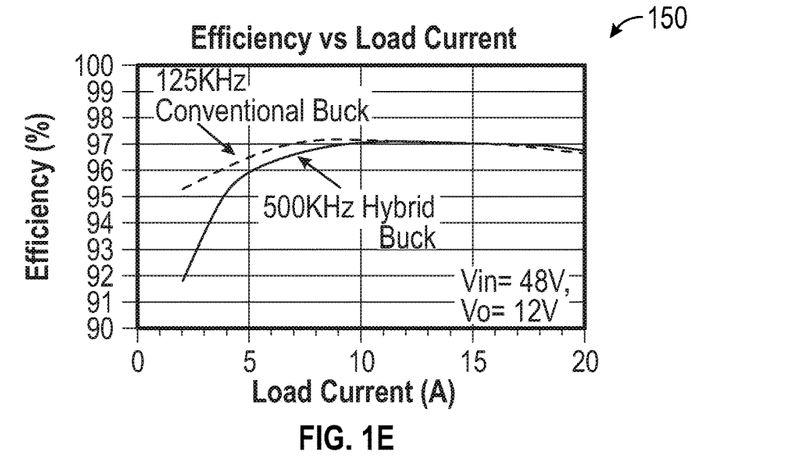
FIG. 1E illustrates a plot depicting an efficiency comparison between the hybrid switched capacitor converter and a traditional buck converter at different load currents in accordance with one or more implementations of the subject technology.

FIG. 1E illustrates a plot 150 depicting an efficiency comparison between the hybrid switched capacitor converter and a traditional buck converter at different load currents in accordance with one or more implementations of the subject technology. In FIG. 1E, a comparison in performance between the traditional buck converter and the hybrid switched capacitor converter circuit 100 is shown. In some aspects, the traditional buck converter operates with a switching frequency of about 125 kHz, whereas the hybrid switched capacitor converter circuit 100 operates with a switching frequency of about 500 kHz. The plot 150 assumes that the converters are supplied with an input voltage of 48V and produce a step-down output voltage of 12V, however, other input voltages and output voltages may apply to this example without departing from the scope of this disclosure.

Note that at load current greater than 10 amperes (A), both converters have almost the same efficiency, although the hybrid switched capacitor converter circuit 100 is running at 4 times faster than the traditional buck converter. The topology of the hybrid switched capacitor converter circuit 100 allows it to switch at a higher switching frequency than the traditional buck converter with comparable efficiency at heavy load. As the hybrid switched capacitor converter circuit 100 runs at higher frequencies, the power density and transient response are more favorable than those of the traditional buck converter, without sacrificing the conversion efficiency. However, at load current lower than 10 A, the performance of the hybrid switched capacitor converter circuit 100 begins to suffer due to higher switching loss since it is switching four times (4×) faster and that there are four transistors to be driven instead of two transistors (akin to the traditional buck converter).

Figure 1F:
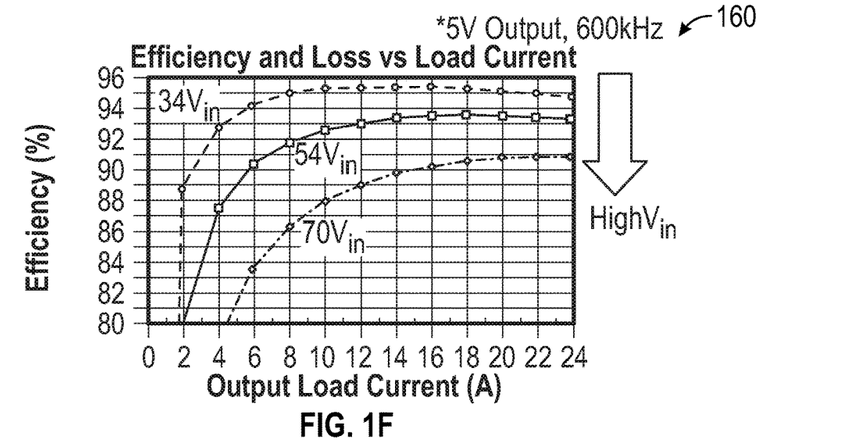
FIG. 1F illustrates a plot depicting efficiency curves of the hybrid switched capacitor converter at different input voltages as a function of load current in accordance with one or more implementations of the subject technology.

FIG. 1F illustrates a plot 160 depicting efficiency curves of an example hybrid switched capacitor converter circuit at different input voltages as a function of load current in accordance with one or more implementations of the subject technology. As shown in FIG. 1F, at a low load current (e.g., less than 10 A), there can be a drastic drop in efficiency as input voltage increases, indicating that the switching loss is the dominant contribution to the overall losses of the hybrid switched capacitor converter circuit 100.

For example, the efficiency of the hybrid switched capacitor converter circuit 100 with an input voltage of 34V is in a range of 95% to 96% when the output load current is at 10 A, whereas the efficiency with an input voltage of 54V is at about 93% at the same output load current. This amounts to a decrease in efficiency of about 2-3 percentage points between the two different input voltages. The drop in efficiency is even more prominent with an input voltage of 70V, where the efficiency is reduced to about 88% (or an 18% reduction compared to the 34V input voltage efficiency curve) when the output load current is at 10 A. The drop in efficiency is even steeper at load current of about 2 A, where the efficiency for a 34V input voltage is about 89% (about 17% decrease compared to the 10 A load current). The efficiency falls below 80% at the load current of 2 A when an input voltage of 70V is applied to the hybrid switched capacitor converter circuit 100.

Part of the reason for the increase in switching loss is that the topology of the hybrid switched capacitor converter circuit 100 drives four transistors instead of two. As such, the subject disclosure provides for increasing the efficiency at light load current (e.g., range of 0.1 A to 10 A) by adding a "super burst mode" to the operation of the hybrid switched capacitor converter circuit 100. In this mode, the transistors Q1 111 and Q2 112 are periodically turned off for one or more switching cycles while the transistors Q3 113 and Q4 114 continue to operate to regulate the output voltage when the load current is light. Since two transistors are now driven instead of four, switching loss is reduced. During the buck phase, the capacitor $C_{MID}$ 115 can be the supply of this regulator and if the capacitor $C_{MID}$ 115 is large enough and the load current is low enough, the voltage across this capacitor will not droop too much even if one of more of the charge pump phases are skipped. Since the transistors Q3 113 and Q4 114 continue to operate normally, the output voltage ripple, control loop small signal properties and dynamic load transient response performance remains intact. This makes entering/exiting the "super burst mode" cleanly. The "super burst mode" can be implemented on top of various other modes that the hybrid switched capacitor converter circuit 100 is operating.

Figure 2:
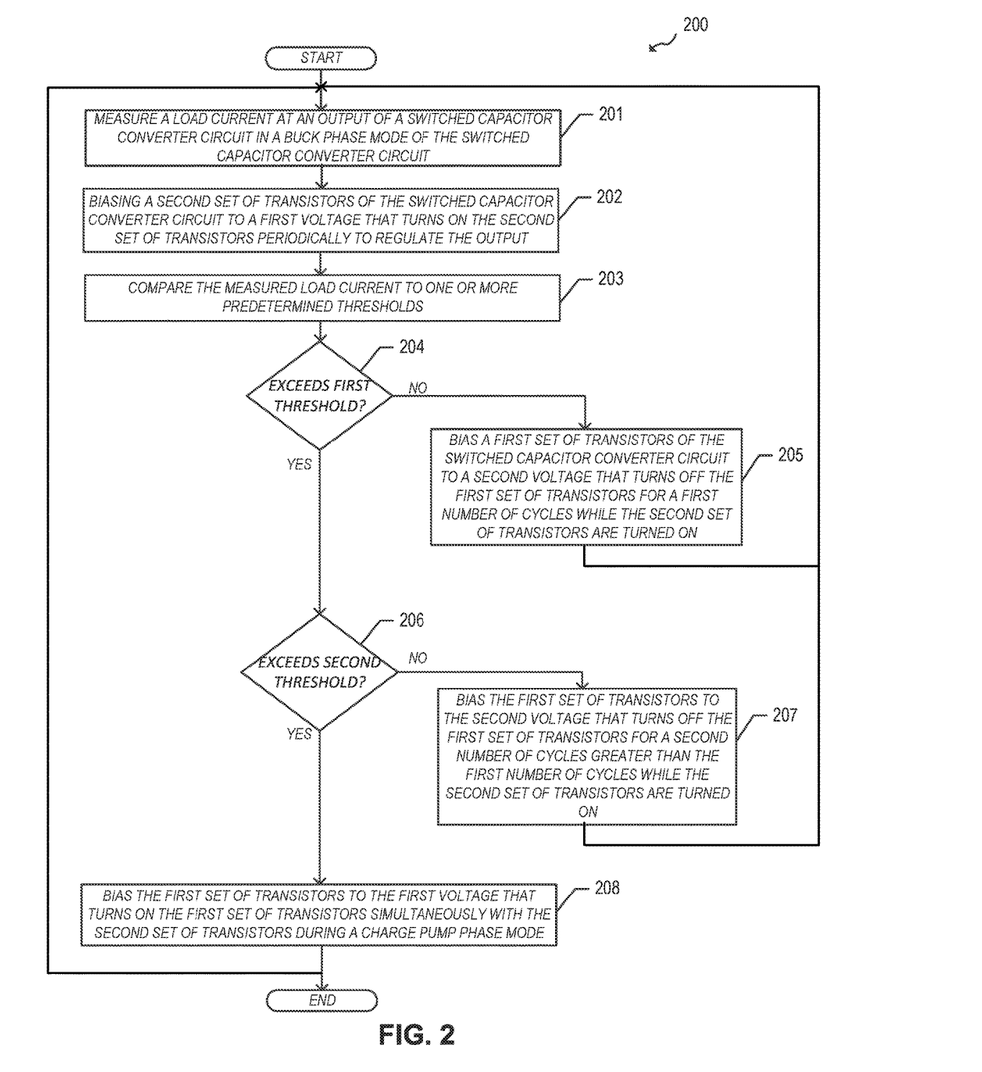
FIG. 2 illustrates a flow chart of an example process for light-load efficiency improvement of hybrid switched capacitor converter in accordance with one or more implementations of the subject technology.

FIG. 2 illustrates a flow chart of an example process 200 for light-load efficiency improvement of hybrid switched capacitor converter in accordance with one or more implementations of the subject technology. Further for explanatory purposes, the blocks of the sequential process 200 are described herein as occurring in serial, or linearly. However, multiple blocks of the process 200 may occur in parallel. In addition, the blocks of the process 200 need not be performed in the order shown and/or one or more of the blocks of the process 200 need not be performed.

The process 200 starts at step 201, where a load current is measured at an output (e.g., 120) of a switched capacitor converter circuit (e.g., 100) in a buck phase mode of the switched capacitor converter circuit 100. At step 202, a second set of transistors of the switched capacitor converter circuit 100 are biased to a first voltage that turns on the second set of transistors periodically to regulate the output voltage. Next, at step 203, the measured load current is compared to one or more predetermined thresholds.

Subsequently, at step 204, a determination is made as to whether the measured load current exceeds a first predetermined threshold of the one or more predetermine thresholds. If the measured load current was determined to exceed the first predetermined threshold, then the process 200 proceeds to step 206. Otherwise, the process 200 proceeds to step 205, where a first set of transistors of the switched capacitor converter circuit 100 are biased to a second voltage that turns off the first set of transistors for a first number of switching cycles while the second set of transistors are turned on to perform the buck phase mode. At completion of step 205, the process 200 returns to step 201.

At step 206, a determination is made as to whether the measured load current exceeds a second predetermined threshold of the one or more predetermine thresholds. If the measured load current was determined to exceed the second predetermined threshold, then the process 200 proceeds to step 208. Otherwise, the process 200 proceeds to step 207, where the first set of transistors are biased to the second voltage that turns off the first set of transistors for a second number of switching cycles while the second set of transistors are turned on. In some aspects, the second number of switching cycles is less than the first number of switching cycles. For example, the second predetermined threshold may corresponds to a load current of 8 A, where the second number of switching cycles represents 2 switching cycles, whereas the first number of switching cycles represents 8 switching cycles if the first predetermined threshold corresponds to a load current of 2 A. At completion of step 207, the process 200 returns to step 201.

At step 208, the first set of transistors are biased to the first voltage that turns on the first set of transistors simultaneously with the second set of transistors during a charge pump phase mode of the switched capacitor converter circuit 100.

In some implementations, the process 200 includes a step for transitioning from the buck phase mode at an end of the one or more switching cycles into a charge pump phase mode of the switched capacitor converter circuit for at least one switching cycle subsequent to the one or more switching cycles. The process 200 also includes a step for biasing the first set of transistors to the first voltage with a fourth gate signal that causes the first set of transistors to turn on periodically during the charge pump phase mode. In some aspects, the first set of transistors and the second set of transistors are turned on simultaneously and periodically during the charge pump phase mode.

In some implementations, the process 200 includes a step for transitioning from the charge pump phase mode at an end of the charge pump phase mode into the buck phase mode. The process 200 also includes a step for biasing the first set of transistors to the second voltage with a fifth gate signal that causes the first set of transistors to turn off for one or more switching cycles in the buck phase mode based on a determination that the measured load current does not exceed the one or more predetermined thresholds at the end of the charge pump phase mode.

In some implementations, the process 200 includes a step for mapping a given measured load current to a predetermined count of how many consecutive switching cycles to skip turning on the first set of transistors before performing the charge pump phase mode. In some implementations, the counting operation is predetermined and count values may be stored in a lookup table, where the values are indexed by the corresponding threshold value. The counted number of switching cycles may be based on which predetermined current threshold corresponds better to the measured load current. In one example, a first threshold corresponding to a load current of 10 A may represent a count of zero switching cycles. In another example, a second threshold corresponding to a load current of 6 A may represent a count of four switching cycles. In still another example, a third threshold corresponding to a load current of 2 A may represent a count of eight switching cycles. In this respect, as the load current decreases, the number of switching cycles increases. For example, if the measured load current is 6 A, then the first set of transistors would be turned off for the number of switching cycles represented by the predetermined threshold that corresponds to 6 A (e.g., four switching cycles). In another example, if the measured load current is 5 A, then the measured load current falls between two predetermined thresholds that represent different counts of switching cycles. In this example, the measured load current does not exceed the threshold that corresponds to 6 A, then the first set of transistors would be turned off for the number of switching cycles represented by the predetermined threshold that corresponds to 2 A (e.g., eight switching cycles). The number of predetermined thresholds may vary depending on implementation without departing from the scope of this disclosure.

The process 200 also includes a step for producing a count signal identifying the number of switching cycles. The process 200 also includes a step for adjusting a clock signal from an oscillator based on the count signal. The process 200 also includes a step for generating a gate signal with the adjusted clock signal. The process 200 also includes a step for sending the gate signal to the first set of transistors that turns off the first set of transistors for the number of switching cycles.

Figure 3A:
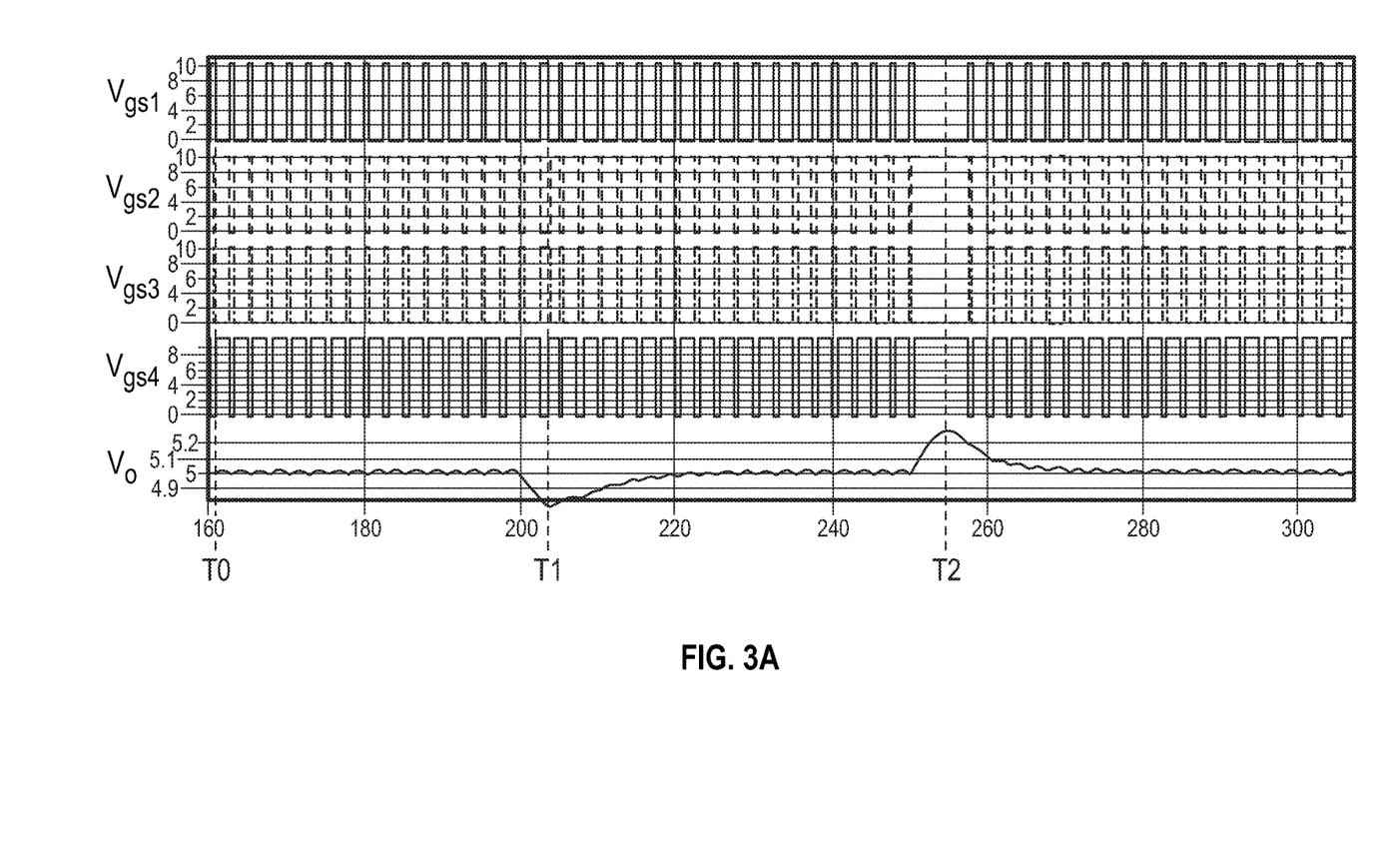
FIG. 3A illustrates a diagram of timing waveforms depicting regular forced-continuous conduction mode for the hybrid switched capacitor converter in accordance with one or more implementations of the subject technology.

FIG. 3A illustrates a diagram of timing waveforms depicting regular forced-continuous conduction mode for the hybrid switched capacitor converter circuit 100 in accordance with one or more implementations of the subject technology. In force continuous conduction mode, the transistors Q1 111, Q3 113 and Q2 112, Q4 114 at turned ON and OFF every switching cycle to maintain output voltage regulation while ensuring a constant switching frequency. In FIG. 3A, the switching of the hybrid switched capacitor converter circuit 100 is performed without the super burst mode implemented. As depicted in FIG. 3A, the output load current is low between the times T0 and T1 and after time T2.

Figure 3B:
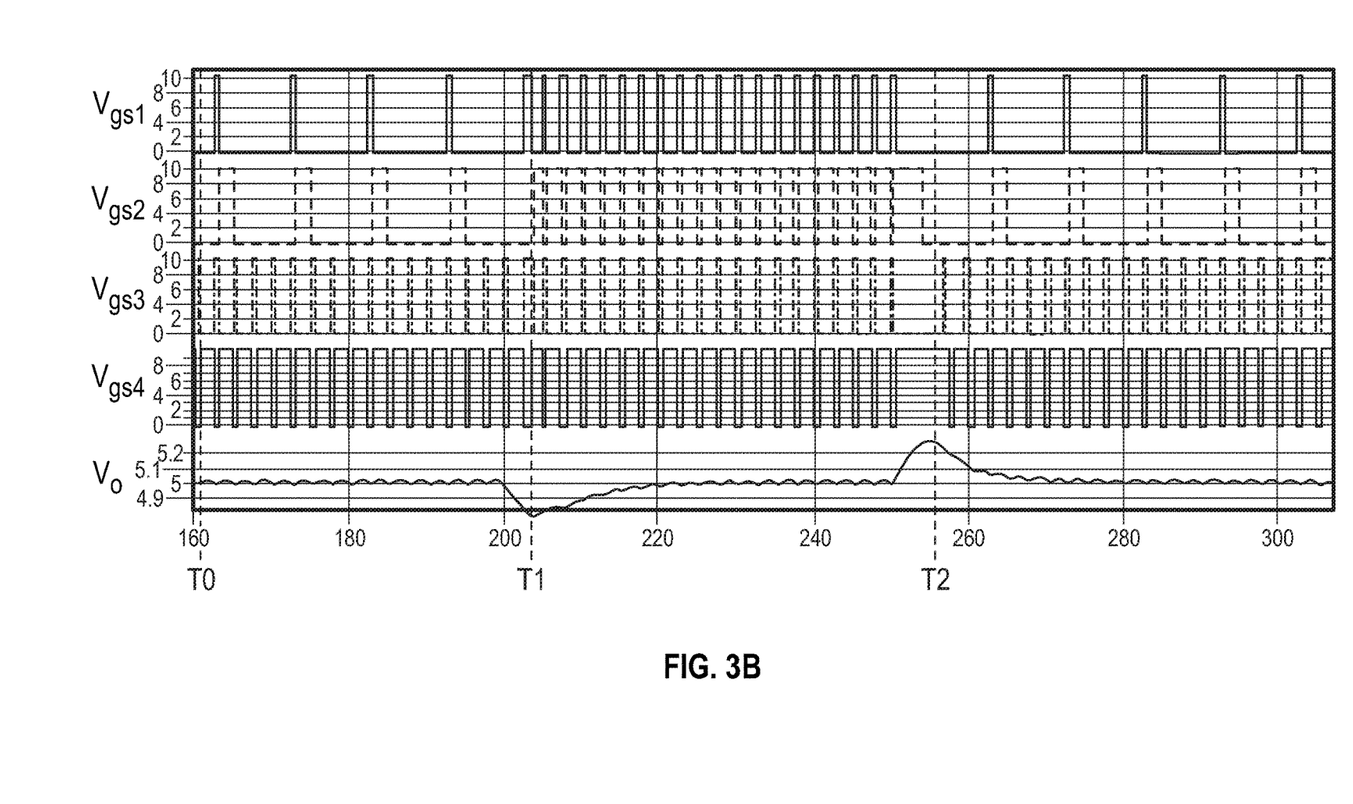
FIG. 3B illustrates a diagram of timing waveforms depicting forced-continuous conduction mode operation with super burst mode operation for the hybrid switched capacitor converter in accordance with one or more implementations of the subject technology.

FIG. 3B illustrates a diagram of timing waveforms depicting forced-continuous conduction mode operation with super burst mode operation for the hybrid switched capacitor converter circuit 100 in accordance with one or more implementations of the subject technology. When the super burst mode is entered at light load current, the charge pump phase mode is entered every other switching cycle or more. In FIG. 3B, the transistors Q1 111 (illustrated as waveform $V_{gs1}$) and Q2 112 (illustrated as waveform $V_{gs2}$) are turned off for multiple consecutive switching cycles before the next charge pump phase mode is entered. For example, it is shown that the transistors Q1 111 and Q2 112 are turned ON (for a charge pump phase mode) every other 4 switching cycles. In some aspects, if the output load current was measured to be lower, the transistors Q1 111 and Q2 112 may be turned ON every other 8 switching cycles, for example. The period during which the transistors Q1 111 and Q2 are not periodically switched lengthens as the load current decreases. The transistors Q3 113 (illustrated as waveform $V_{gs3}$) and Q4 114 (illustrated as waveform $V_{gs4}$) maintain switching at a constant switching frequency as part of the buck phase of the switched capacitor converter circuit 100.

As depicted in FIG. 3B, the output load current is low between the times T0 and T1 and after time T2. In response to the output load current measured to be low, the super burst mode is entered between the times T0 and T1 and after time T2. For example, the gates of the transistors Q1 111 and Q2 112 are placed in the super burst mode by being driven with a voltage that causes the transistors Q1 111 and Q2 112 to turn off for a number of switching cycles based on a particular predetermined threshold (which represents a particular counted number of switching cycles). Also shown on these two figures (e.g., FIGS. 3A and 3B) are the response to a load step (at times T1 and T2). As can be seen, the response is identical, indicating that the super burst mode has no impact on the response from light to heavy load and from heavy to light load.

Figure 3C:
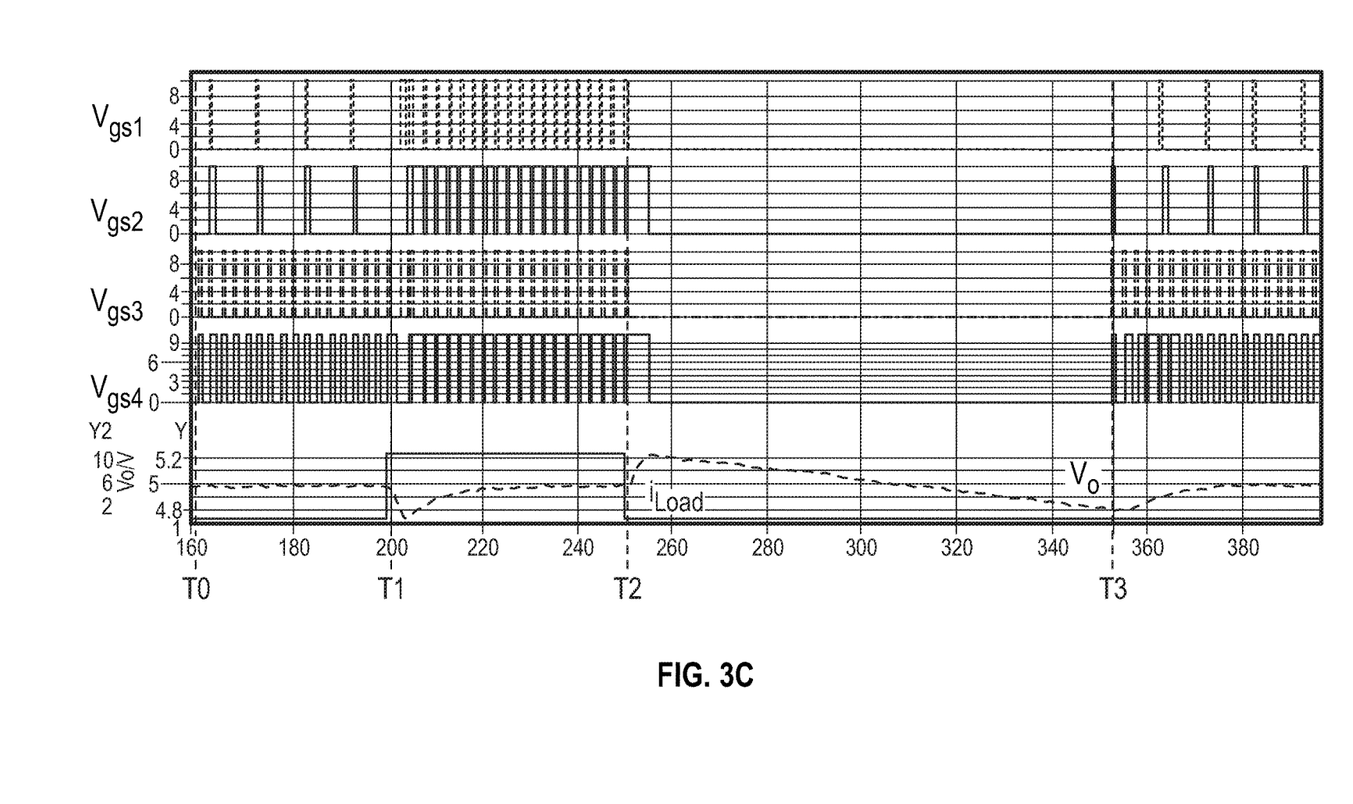
FIG. 3C illustrates a diagram of timing waveforms depicting pulse skip mode operation with super burst mode operation for the hybrid switched capacitor converter in accordance with one or more implementations of the subject technology.

FIG. 3C illustrates a diagram of timing waveforms depicting pulse skip mode operation with super burst mode operation for the hybrid switched capacitor converter circuit 100 in accordance with one or more implementations of the subject technology. In the hybrid switched capacitor converter circuit 100 with pulse skip mode, the super burst mode can be overlaid on top of the pulse skip mode. The idea is the same, i.e. to enter the charge pump phase once in every other or more switching cycles. FIG. 3C shows the switching waveform of the hybrid switched capacitor converter circuit 100 at light load and its load step response. Before time T1 and after time T2, the output load current is light and once again this example shows that the charge pump phase mode (illustrated by waveforms $V_{gs1}$ and $V_{gs2}$) is entered every other 4 switching cycles. In particular, the super burst mode is entered between the times T0 and T1, followed by entry into a normal mode operation (e.g., FCCM) between the times T1 and T2, further followed by entry into the pulse skip mode between the times T2 and T3, and again entry into the super burst mode after time T3. Once again entering or exiting the super burst mode is seamless.

Figure 3D:
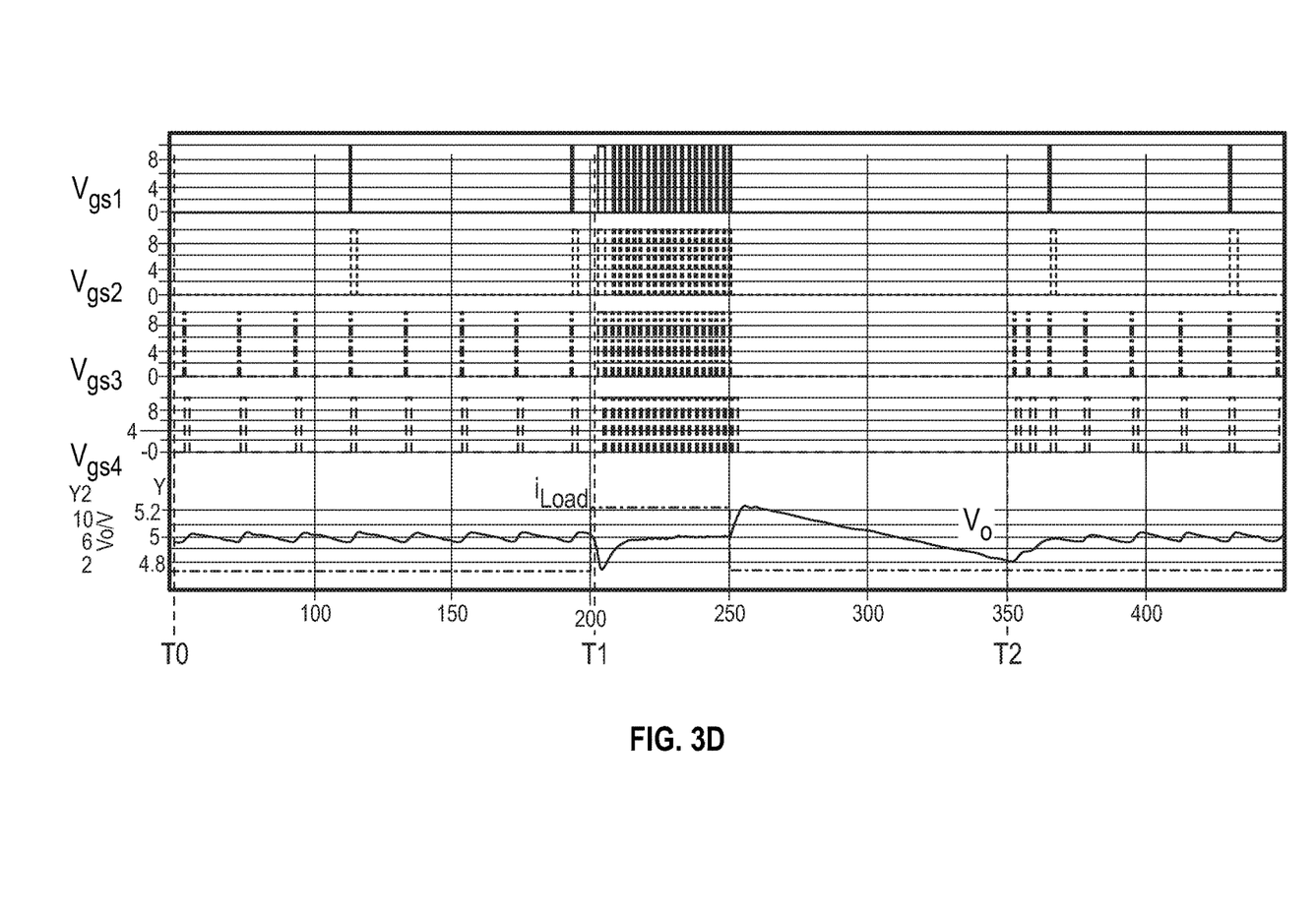
FIG. 3D illustrates a diagram of timing waveforms depicting burst mode operation with super burst mode operation for the hybrid switched capacitor converter in accordance with one or more implementations of the subject technology.

FIG. 3D illustrates a diagram of timing waveforms depicting burst mode operation with super burst mode operation for the hybrid switched capacitor converter circuit 100 in accordance with one or more implementations of the subject technology. The burst mode operation is performed when the transistors Q3 113 and Q4 114 are skipping switching cycles to further reduce switching losses at light load but it comes at the expense of maintaining a constant switching frequency. The super burst mode can be incorporated into the burst mode by switching the transistors Q1 111 and Q2 112 less frequently than the transistors Q3 113 and Q4 114 depending on the measured load current. For example, the period of switching cycles for the transistors Q1 111 and Q2 112 may be greater than the period of switching cycles for the transistors Q3 113 and Q4 114, where the transistors Q1 111 and Q2 112 turn on after every 8 switching cycles and the transistors Q3 113 and Q4 114 turn on after every 4 switching cycles. In other words, the charge pump phase mode is entered infrequently (e.g., when the transistors Q1 and Q2 are turned on) and waveforms Vgs1 and Vgs2 show that the super burst mode is entered after every 4 switching cycles of the transistor Q3 113 (illustrated as waveform $V_{gs3}$).

Figure 4:
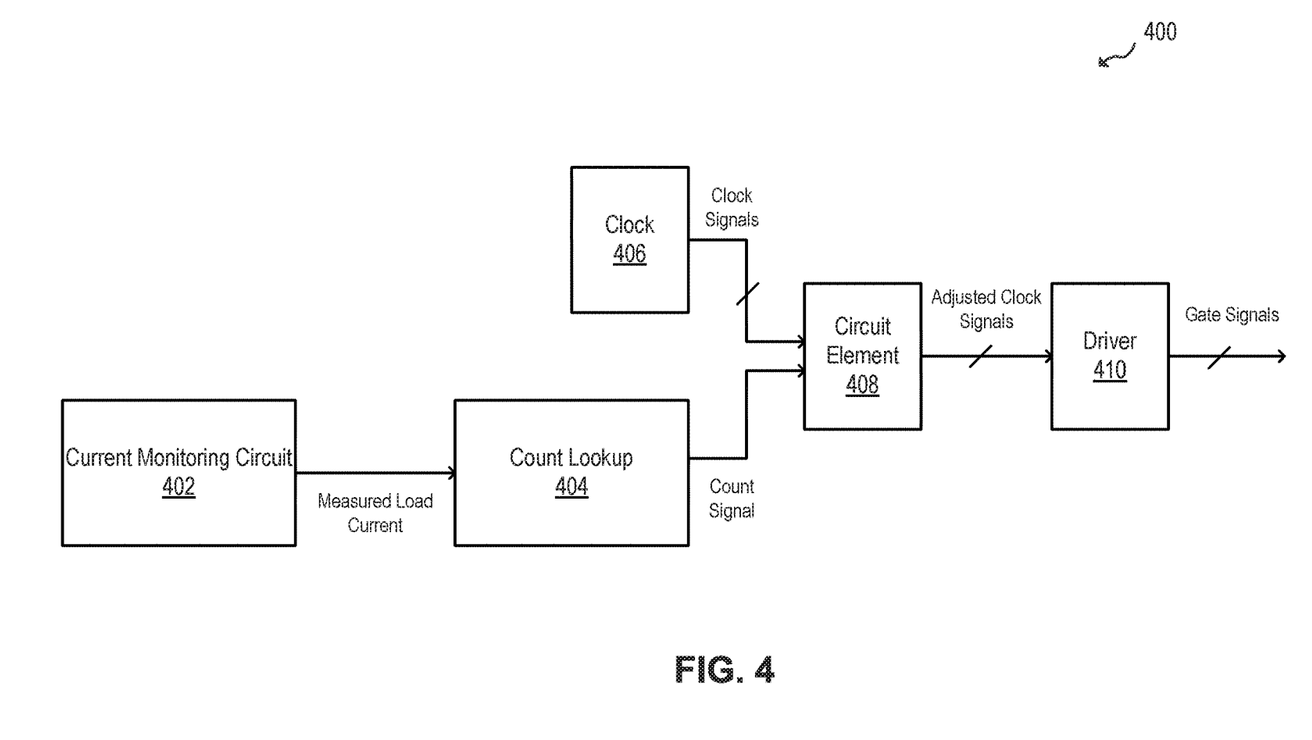
FIG. 4 illustrates a schematic diagram of an example of a control circuitry for controlling the switched capacitor converter circuit in accordance with one or more implementations of the subject technology.

FIG. 4 illustrates a schematic diagram of an example of a control circuitry 400 for controlling the switched capacitor converter circuit in accordance with one or more implementations of the subject technology. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The control circuitry 400 includes a current monitoring circuit 402, a count lookup 404, a clock gate circuit 406, a circuit element 408, and a driver 410. The current monitoring circuit 402 is configured to measure the output load current. The count lookup 404 is configured to receive the measured load current signal as input from the current monitoring circuit 402 and compare the measured load current signal to one or more predetermined thresholds. Each of the predetermined threshold corresponds to a predetermined count of how many consecutive switching cycles to skip turning on (or number of consecutive switching cycles to keep turned off) for a given measured load current. The count lookup 404 performs the threshold comparison and lookup upon receiving the measured load current signal from the current monitoring circuit 402. Depending on whether the measured load current corresponds to (or matches) a particular threshold or falls between two thresholds (where the threshold that is exceeded by the measured load current is selected), the count lookup 404 issues a count signal identifying the number of switching cycles that correspond to the particular threshold. The circuit element 408 may be a logical gate (e.g., AND, NOR, XOR, etc.) that combines the clock signal with the count signal, thus producing an adjusted clock signal. The adjusted clock signal may be in the form of an oscillation signal with a duty cycle having an OFF state (or logical 0) for one or more switching cycles depending on the number of switching cycles counted and an ON state (or logical 1) subsequent to the OFF state. In some aspects, the driver 410 is an inverter. In other aspects, the driver 410 is a non-inverting buffer.

In some implementations, the clock gate circuit 406 is comprised of the circuit element 408 and the driver 410. In this respect, the clock gate circuit 406 may be configured to adjust the clock signal based on the count signal, produce the gate signal with the adjusted clock signal, and send the gate signal with the second voltage to the first set of transistors (e.g., Q1 111 and Q2 112) that turns off the first set of transistors for the number of switching cycles. In some implementations, the clock gate circuit 406 adjusts a bus of clock signals (e.g., complementary clock signals) based on the count signal to produce a bus of adjusted clock signals. This bus of adjusted clock signals are then driven by the driver 410 as a bus of gate signals to the first set of transistors (e.g., Q1 111 and Q3 113) and the second set of transistors (e.g., Q2 112 and Q4 114) for complementary switching. In some implementations, each gate signal may be generated and driven individually by separate instances of the circuit element 406 and the driver 410.

In some implementations, the control circuitry 400 includes an error amplifier configured to compare an output voltage that corresponds to the measured load current with an input reference voltage. In some aspects, an inverting input of the error amplifier is biased with the input reference voltage and a non-inverting input of the error amplifier is biased with the output voltage. In some aspects, the input reference voltage may be supplied by a voltage source that is on-chip with the control circuitry, or is located off-chip (e.g., different die) in other aspects. The input reference voltage may represent an ideal (or expected) regulated output voltage for the hybrid switched capacitor converter circuit 100.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus for reducing switching losses in output voltage regulation, comprising:
    a switched capacitor converter circuit comprising a first set of transistors and a second set of transistors; and
    control circuitry coupled to the switched capacitor converter circuit, the control circuitry configured to:
        periodically switch, during a buck phase of the switched capacitor converter circuit, the first and second sets of transistors on and off converse to each other according to a switching scheme to provide a load current at an output of the switched capacitor converter circuit;
        measure the load current at the output of the switched capacitor converter circuit;
        periodically switch, during the buck phase, in response to and while the measured load current satisfies a first threshold of a set of predetermined thresholds, the first set of transistors off for a first period of switching cycles during which the second set of transistors are periodically switched on an off according to the switching scheme; and
        resume, in response to the measured load current satisfying a second threshold of the set of predetermined thresholds, switching the first set of transistors on and off according to the switching scheme.

2. The apparatus of claim 1, wherein the first set of transistors is momentarily switched on after each first period of switching cycles.

3. The apparatus of claim 1, wherein the control circuitry is configured to:
    compare the measured load current to the first threshold of the set of predetermined thresholds;
    determine whether the measured load current exceeds the first threshold;
    bias the first set of transistors with a first gate signal that causes the first set of transistors to turn off for a first number of switching cycles when the measured load current was determined to not exceed the first threshold; and bias the first set of transistors with a second gate signal that causes the first set of transistors to turn off for a second number of switching cycles when the measured load current was determined to exceed the first threshold, wherein the first number of switching cycles is greater than the second number of switching cycles.

4. The apparatus of claim 3, wherein the control circuitry is configured to:
compare the measured load current to the second threshold of the set of predetermined thresholds;
determine whether the measured load current exceeds the second threshold; and
bias the first set of transistors with a third gate signal that causes the first set of transistors to turn on periodically and simultaneously with the second set of transistors during a charge pump phase when the measured load current was determined to exceed the second threshold, the second threshold being greater than the first threshold.

5. The apparatus of claim 1, wherein the first set of transistors comprises a first transistor and a second transistor connected in series between an input voltage and a second node, wherein the second set of transistors comprises a third transistor and a fourth transistor connected in series with the first set of transistors between the second node and ground, wherein the first transistor and the third transistor operate in unison, wherein the second transistor and the fourth transistor operate in unison, and wherein the third transistor and the fourth transistor operate complementary to one another during the buck phase.

6. The apparatus of claim 5, wherein the control circuitry is configured to periodically turn on the third transistor and the fourth transistor at a same switching frequency.

7. The apparatus of claim 1, wherein the first set of transistors comprises a second transistor and a third transistor, wherein the second set of transistors comprises a first transistor and a fourth transistor, wherein the second transistor is coupled between the first transistor and a second node and the third transistor is coupled between the fourth transistor and the second node, wherein the second transistor and the third transistor operate in unison, wherein the first transistor and the fourth transistor operate in unison, and wherein the third transistor and the fourth transistor operate complementary to one another during the buck phase.

8. The apparatus of claim 1, wherein the control circuitry comprises:
a current monitoring circuit configured to measure the load current and produce a measured load current signal;
a count lookup circuit configured to receive the measured load current signal from the current monitoring circuit and to store a predetermined mapping for each threshold of the set of predetermined thresholds that maps a particular threshold of the set of predetermined thresholds to a predetermined number of consecutive switching cycles during which the first set of transistors are to be turned off, wherein the count lookup circuit is configured to produce a count signal identifying the predetermined number of switching cycles mapped to the particular threshold that corresponds to a given measured load current; and
a circuit element configured to adjust a clock signal based on the count signal and produce an adjusted clock signal; and
a driver circuit configured to produce a gate signal with the adjusted clock signal and send the gate signal to the first set of transistors that turns off the first set of transistors for the first period of switching cycles.

9. The apparatus of claim 8, wherein the first period of switching cycles increases as the measured load current decreases.

10. The apparatus of claim 1, wherein the control circuitry being configured to resume switching the first set of transistors on and off according to the switching scheme comprises the control circuitry being configured to:
periodically switch, during a charge pump phase of the of the switched capacitor converter circuit, the first and second sets of transistors on and off converse to each other according to the switching scheme for a second period of switching cycles, the second period of switching cycles being less than the first period of switching cycles,
wherein the charge pump phase immediately follows a respective first period of switching cycles.

11. The apparatus of claim 1, wherein the control circuitry is configured to:
place, after the first period of switching cycles, the first and second sets of transistors in a pulse skip mode of the switched capacitor converter circuit;
periodically switch, during the pulse skip mode, the first and second sets of transistors off for a duration of the pulse skip mode; and
resume, in response to the measured load current satisfying at least one threshold of the set of predetermined thresholds, after the duration of the pulse skip mode, switching the first set of transistors off for a third period of switching cycles.

12. The apparatus of claim 1, wherein the control circuitry is configured to:
periodically switch, during a burst mode of the of the switched capacitor converter circuit, the first and second sets of transistors on and off converse to each other according to the switching scheme;
place, in response to the measured load current satisfying at least one threshold of the set of predetermined thresholds, the first set of transistors in a super burst mode during the burst mode; and
periodically switch, during the burst mode, the first set of transistors off for a fourth period of switching cycles in the super burst mode during which the second set of transistors are periodically switched on and off for a fifth period of switching cycles in the burst mode, wherein the fifth period of switching cycles is less than the fourth period of switching cycles.

13. A method of reducing switching losses in output voltage regulation, comprising:
biasing a first set of transistors and a second set of transistors of a switched capacitor converter circuit to periodically switch, during a buck phase of the switched capacitor converter circuit, the first and second sets of transistors on and off converse to each other according to a switching scheme to provide a load current at an output of the switched capacitor converter circuit;
measuring the load current at the output of the switched capacitor converter circuit;
biasing the first set of transistors to periodically switch, during the buck phase, in response to and while the measured load current satisfies a first threshold of a set of predetermined thresholds, the first set of transistors off for a first period of switching cycles during which the second set of transistors are periodically switched on an off according to the switching scheme; and resuming, in response to the measured load current satisfying a second threshold of the set of predetermined thresholds, switching the first set of transistors on and off according to the switching scheme.

14. The method of claim 13, further comprising:
comparing the measured load current to the first threshold;
determining whether the measured load current exceeds the first threshold;
biasing a first set of transistors with a first gate signal that causes the first set of transistors to turn off for a first number of switching cycles when the measured load current was determined to not exceed the first threshold; and
biasing the first set of transistors with a second gate signal that causes the first set of transistors to turn off for a second number of switching cycles when the measured load current was determined to exceed the first threshold, wherein the first number of switching cycles is greater than the second number of switching cycles.

15. The method of claim 14, further comprising:
comparing the measured load current to the second threshold;
determining whether the measured load current exceeds the second threshold; and
biasing the first set of transistors with a third gate signal that causes the first set of transistors to turn on periodically during a charge pump phase mode when the measured load current was determined to exceed the second threshold, the second threshold being greater than the first threshold.

16. The method of claim 13, further comprising:
biasing the first and second sets of transistors to periodically switch, during a charge pump phase of the of the switched capacitor converter circuit, the first and second sets of transistors on and off converse to each other according to the switching scheme for a second period of switching cycles, the second period of switching cycles being less than the first period of switching cycles,
wherein the charge pump phase immediately follows each first period of switching cycles.

17. The method of claim 13, further comprising:
placing, after the first period of switching cycles, the first and second sets of transistors in a pulse skip mode of the switched capacitor converter circuit;
biasing the first and second sets of transistors to periodically switch, during the pulse skip mode, the first and second sets of transistors off for a duration of the pulse skip mode; and
resuming, in response to the measured load current satisfying at least one threshold of the set of predetermined thresholds, after the duration of the pulse skip mode, switching the first set of transistors off for a third period of switching cycles.

18. The method of claim 13, further comprising:
placing, in response to the measured load current satisfying at least one threshold of the set of predetermined thresholds, the first set of transistors in a super burst mode during a burst mode of the switched capacitor converter circuit; and
biasing the first and second sets of transistors to periodically switch, during the burst mode, the first set of transistors off for a fourth period of switching cycles in the super burst mode during which the second set of transistors are periodically switched on and off for a fifth period of switching cycles in the burst mode, wherein the fifth period of switching cycles is less than the fourth period of switching cycles.

19. The method of claim 13, further comprising:
mapping at least one threshold of the set of predetermined thresholds to one of a plurality of predetermined counts of how many consecutive switching cycles to skip turning on the first set of transistors before performing a charge pump phase mode;
selecting one of the plurality of predetermined counts based on a comparison between a given measured load current and the at least one threshold;
producing a count signal that provides a number of switching cycles based on the selected predetermined count;
adjusting a clock signal from an oscillator based on the count signal;
generating a gate signal with the adjusted clock signal; and
sending the gate signal to the first set of transistors that turns off the first set of transistors for the number of switching cycles.

20. A system for reducing switching losses in output voltage regulation, comprising:
means for periodically switching, during a buck phase of a switched capacitor converter circuit, a first set of transistors and a second set of transistors on and off converse to each other according to a switching scheme to provide a load current at an output of the switched capacitor converter circuit;
means for measuring the load current at the output of the switched capacitor converter circuit;
means for periodically switching, during the buck phase, in response to and while the measured load current satisfies a first threshold of a set of predetermined thresholds, the first set of transistors off for a first period of switching cycles during which the second set of transistors are periodically switched on an off according to the switching scheme; and
means for resuming, in response to the measured load current satisfying a second threshold of the set of predetermined thresholds, switching the first set of transistors on and off according to the switching scheme.

21. An apparatus to generate a regulated voltage, the apparatus comprising:
a switched capacitor converter circuit comprising a first set of transistors and a second set of transistors;
a current monitoring circuit configured to compare load current at the output of the switched capacitor converter circuit to a specified threshold current; and
control circuitry configured to:
activate the first set of transistors complementary to the second set of transistors during switching duty cycles to generate a regulated output voltage when the load current is greater than or equal to the specified threshold current; and
deactivate a transistor of the first set of transistors and a transistor of the second set of transistors during one or more switching duty cycles when the load current is less than the specified threshold, and activate remaining transistors of the first set of transistors complementary to remaining transistors of the second set of transistors.

22. The apparatus of claim 21,
wherein the switched capacitor converter circuit includes first, second, third, and fourth transistors connected in series; the first set of transistors includes the first and third transistors, and the second set of transistors includes the second and fourth transistors; and wherein the third transistor and the fourth transistor are activated, and the third transistor is switched complementary to the fourth transistor when the load current is less than the specified threshold current to generate the regulated output voltage, and the first and second transistors are deactivated when the load current is less than the specified threshold current.

23. The apparatus of claim 22, wherein a switching cycle of the third and fourth transistors is periodically skipped when the load current is less than the specified threshold current.

24. The apparatus of claim 21, wherein the switched capacitor converter circuit includes a charge pump circuit portion and the regulated output of the switched capacitor converter circuit is determined by the output of the charge pump circuit and the switching duty cycle.

25. A method of operating a switched capacitor converter circuit, the method comprising:

switching a first set of transistors of the switched capacitor converter circuit and a second set of transistors of the switched capacitor converter circuit to generate a regulated output voltage, wherein the first set of transistors is activated conversely to the second set of transistors during a switching duty cycle;

comparing load current at an output of the switched capacitor converter circuit to a specified threshold current;

deactivating a transistor of the first set of transistors and a transistor of the second set of transistors during one or more switching duty cycles when the load current is less than the specified threshold current and activating remaining transistors of the first set of transistors conversely with remaining transistors of the second set of transistors; and activating all transistors of the first set of transistors conversely with all transistors of the second set of transistors during the switching duty cycles when the load current is greater than or equal to the specified threshold current.

26. The method of claim 25, wherein switching a first set of transistors and a second set of transistors includes switching first and third transistors of four transistors connected in series as the first set of transistors, and switching second and fourth transistors of the four transistors connected in series as the second set of transistors; and wherein deactivating a transistor of the first set of transistors and a transistor of the second set of transistors includes deactivating the first and second transistors of the four transistors connected in series.

27. The method of claim 26, including switching the third transistor complimentary to switching the fourth transistor to generate the regulated output voltage when the load current is less than the specified threshold current.

28. The method of claim 25, including:

generating a regulated output voltage determined by the output of a charge pump circuit of the switched capacitor converter circuit and a switching duty cycle of the third and fourth transistors when the load current is less than the specified threshold current; and periodically skipping a switching cycle of the third and fourth transistors when the load current is less than the specified threshold current.

* * * * *